United States Patent [19]

Antolino

[11] 4,099,654
[45] Jul. 11, 1978

[54] SELECTIVE DISPENSING UTENSIL

[75] Inventor: Angelo Antolino, Pelham Manor, N.Y.

[73] Assignee: New Colony Inventions, Inc., Mt. Vernon, N.Y.

[21] Appl. No.: 685,283

[22] Filed: May 11, 1976

[51] Int. Cl.² ............................................. B67C 11/04
[52] U.S. Cl. .................................... 222/184; 222/462; 222/561; 141/344; 209/417
[58] Field of Search ............... 222/184, 561, 460, 461, 222/462; 141/344, 345; 209/417; 210/474

[56] References Cited

U.S. PATENT DOCUMENTS

| 284,172 | 9/1883 | Brainerd | 222/460 X |
|---|---|---|---|
| 543,540 | 7/1895 | Sauer | 222/561 X |
| 853,427 | 5/1907 | Stoewsand | 141/345 X |
| 1,265,177 | 5/1918 | Coleman | 222/184 X |
| 1,421,245 | 6/1922 | Johnson | 209/417 X |
| 1,740,384 | 12/1929 | Wright | 222/460 X |
| 2,191,395 | 2/1940 | Moser | 210/474 |
| 2,781,955 | 2/1957 | Kidd | 222/561 X |
| 2,868,246 | 1/1959 | Nelson | 141/344 X |

Primary Examiner—Robert B. Reeves
Assistant Examiner—Frederick R. Handren
Attorney, Agent, or Firm—Natter & Natter

[57] ABSTRACT

A graduated measuring cup having a sloped transverse wall surface for directing liquid contents toward a centrally located outlet orifice for gravity flow discharge. A sluice valve assembly is attachable to the cup in registration with the outlet orifice for selectively regulating the rate of discharge flow. The sluice valve assembly is detachable from the cup for cleaning or replacement. A strainer basket having an apertured disc inset is positionable over the mouth of the cup for filtering incoming liquids.

7 Claims, 5 Drawing Figures

U.S. Patent  July 11, 1978  4,099,654
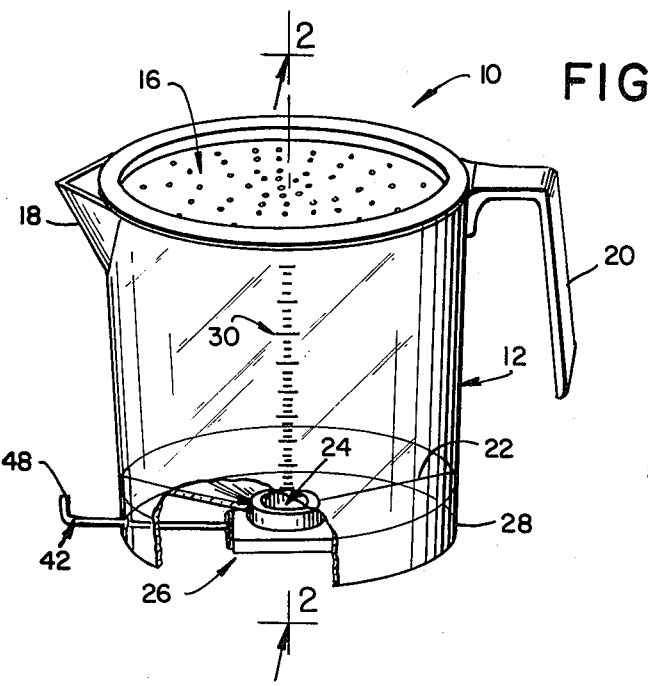
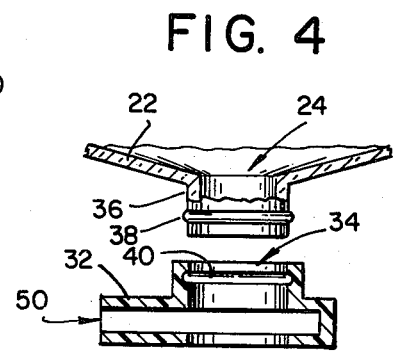
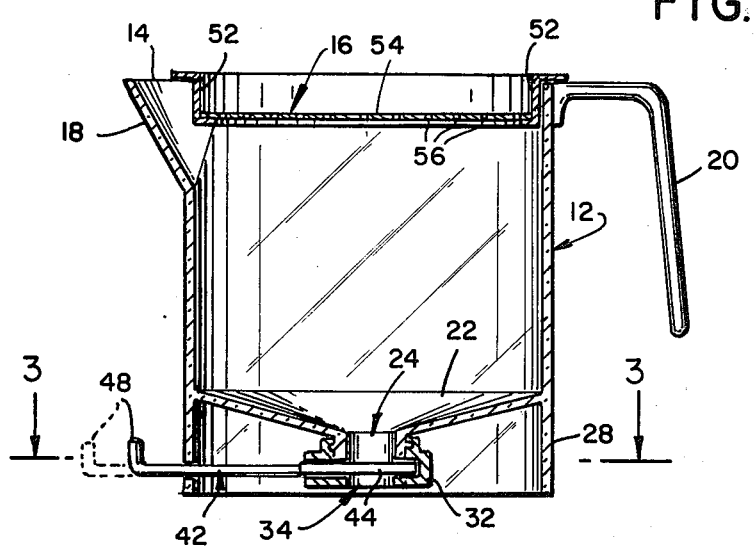
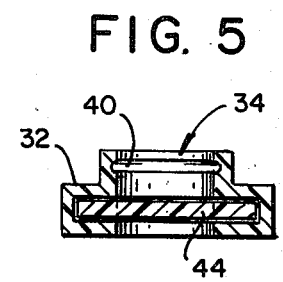
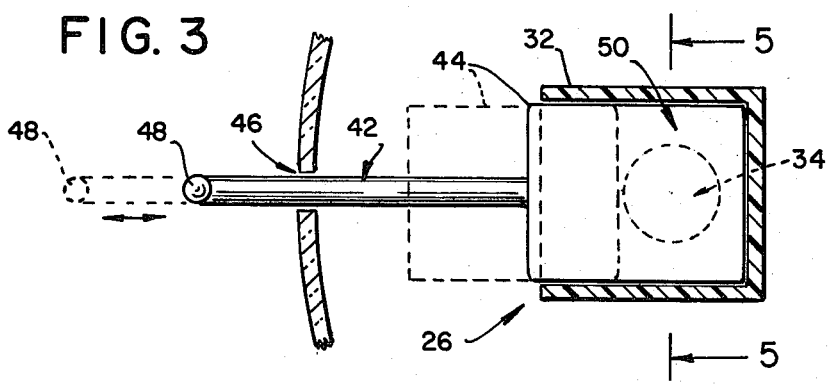

SELECTIVE DISPENSING UTENSIL

BACKGROUND OF THE INVENTION

1. Field of the Invention

The invention relates to a receptacle for treatment of fluid materials and specially to a container which can be used for filtering, separating, and dispensing measured quantities of a liquid.

In particular, the vessel of this invention is concerned with a beaker or cup having a bottom drain opening for gravity flow discharge. The device includes a companion sluice valve assembly for controlling the rate of discharge flow. A strainer basket is also incorporated for filtering incoming liquids.

2. Description of the Prior Art

The utensil of this invention is designed to provide in one unit a measuring cup having the combined features and convenience of use previously not available in such devices. The improved design of this invention incorporates detachable component parts which can be disassembled for cleaning and replacement to provide trouble-free operation.

A sluice valve assembly is adapted for a snap-fit or equivalent coupling attachment to an exterior portion of the cup. The valve assembly includes a valve housing and a slidable valve member which can be readily removed from within the housing. The significance of this structural arrangement of the valve assembly is particularly advantageous when the device is used as a kitchen utensil for food handling or in laboratory use wherein cleanliness and hygienic conditions are of particular importance. Additionally, since the valve assembly is readily accessible, it can be washed free of deposits of foreign matter which can interfere with its smooth and effective operation. In contrast, prior devices of this nature which have been patented, such as those shown in U.S. Pat. No. 954,346 or in U.S. Pat. No. 1,327,389, include valve mechanisms which form an integral part of the device and are not separately removable for maintenance or replacement. A disadvantage therefore of these patented devices is that it is more difficult to maintain sanitary conditions as, for example, by sterilization of the individual valve components. Further, routine maintenance is hampered when the valve is relatively inaccessible.

Another problem with prior art devices is that it is difficult to obtain a smooth, steady, laminar flow through a discharge outlet as may be required for accurate measurement of the discharged material. This is overcome, in part, in the instant invention by the application of a strainer basket which is placed over the mouth of the cup. In addition, the strainer is adapted for receiving one of a plurality of apertured disc insets wherein each of the discs contains an apertured grid pattern for preventing different size particulate material from entering into the cup and thus contaminating the valve assembly or otherwise causing a blockage or interference with proper operation of the valve mechanism. In this connection and as a further feature, a sloped transverse wall surface has been provided for directing the liquid contents toward a centrally located outlet orifice for gravity flow discharge. The funnel-like surface increases the flow velocity and is believed to reduce sedimentation on the floor or bottom of the cup. This approach of incorporating a funnel shaped interior transverse wall surface in a device of this type for improving discharge flow characteristics has not previously been shown.

BRIEF SUMMARY OF THE INVENTION

The subject matter of the dispensing utensil of this invention includes a substantially cylindrical cup shaped vessel having an open mouth for receiving liquid materials and a sloped interior transverse wall surface for directing the contents toward a centrally located outlet orifice for gravity flow discharge of same. A sluice valve assembly is releasably attached to the cup in registration with the outlet orifice for selectively regulating the rate of discharge flow. The valve assembly includes a valve housing for accommmodating a slidable valve member. The nature of the invention is such that a smooth, uniform and laminar discharge flow can be controlled by the user's push-pull manipulation of a terminal end of the valve member.

A constructional feature of this device is that the substantially cylindrical wall of the cup shaped vessel extends below the outlet orifice and forms a skirt enclosure which will support the dispensing utensil when placed on a horizontal surface. The sluice valve assembly is externally mounted to the cup and recessed within the skirt enclosure.

A purpose of this device is for the separation of liquids having different specific gravities and can be applied in the culinary arts, for instance, to remove grease or fats from gravies or soups or for clarifying butter. The invention also incorporates a separable strainer basket which is suspendable within the mouth of the cup. The strainer basket is provided with an apertured disc inset wherein each of a plurality of such apertured discs is provided respectively with different size openings forming a grid pattern, and an appropriate disc can be selected in accordance with the materials to be separated or filtered from the inflowing liquid. The removal of such particulate materials is useful for eliminating impurities and also for preventing clogging of the valve mechanism.

It should further be noted that the cup is provided with graduated markings to facilitate the determination of and to control the amount of liquid ingredients to be dispensed. In this connection, the utensil can be used for dispensing such food ingredients as pancake batter. In addition, the constituent components as provided for in a recipe can be quickly and easily dispensed with the device being used as a general purpose measuring cup.

Having thus summarized the invention, it will be seen that an object thereof is to provide a dispensing utensil of the general character described herein which is not subject to the disadvantages of the prior art.

Specifically, it is an object of the instant invention to provide a dispensing utensil having a cup shaped vessel with a valve controlled outlet orifice for regulating gravity discharge flow from the vessel.

It is a further object of this invention to provide a dispensing utensil which can be held in one hand and the valve mechanism operated using the other hand to selectively control the quantity of liquid contents discharged.

A still further object of this invention is to provide a dispensing utensil wherein the valve assembly is readily removable for cleaning and maintenance purposes.

A further object of this invention is to provide a dispensing utensil having a strainer basket adapted to be seated over the mouth thereof wherein selected aperture disc insets can be used with the strainer basket for predetermining the size of particles to be filtered from the incoming liquid.

Still another object of this invention is to provide a dispensing utensil having an interior transverse wall surface being sloped toward a centrally located outlet orifice for improving the discharge flow characteristics.

The above and other objects, features and advantages of this invention will be apparent from the following description of the preferred embodiment when considered in connection with the accompanying drawings.

BRIEF DESCRIPTION OF THE DRAWINGS

In the accompanying drawings in which are shown the preferred embodiments of the invention:

FIG. 1 is a perspective view of the dispensing utensil of this invention with a portion being cut away to expose the sluice valve assembly;

FIG. 2 is a sectional view taken substantially along line 2—2 of FIG. 1 and shows the dispensing utensil of this invention including the component strainer basket and sluice valve assembly mounted in registration with the outlet orifice and recessed within the skirt portion of the extended cup wall section;

FIG. 3 is a sectional view taken substantially along line 3—3 of FIG. 2 and shows the sluice valve assembly including the valve housing and slidable valve member shown in an open position with a valve stem shown extending through the skirt portion of the cup wall;

FIG. 4 is a partial sectional view shown to an enlarged scale indicating in detail the coupling arrangement between the outlet orifice and the valve housing; and FIG. 5 is a sectional view slightly enlarged and taken substantially along line 5—5 of FIG. 3 and shows the valve housing including the channel for receiving the gate closure portion of the slidable valve member.

DETAILED DESCRIPTION OF THE INVENTION

Referring now in detail to the drawings, the reference numeral 10 denotes generally a dispensing utensil as constructed in accordance with this invention. The dispensing utensil 10 as typically illustrated in FIGS. 1 and 2 appears as a beaker or cup shaped vessel having a substantially cylindrical body portion 12 which terminates at an upper end in a peripheral edge 14 defining a mouth opening for receiving a strainer basket 16. The peripheral edge 14 also forms a spout or pouring lip 18. A handle extension 20 is shown as being formed integrally with the body portion 12 and is angled as shown for comfortable gripping. The body portion 12 is provided with an interior transverse wall or intermediate surface 22 which is sloped gradually toward a centrally located outlet orifice 24. The funnel or frustoconical shaped intermediate surface 22 provides desired hydraulic characteristics for the outflow of liquids and has a constant gradient being in the range of 10°-20° from the horizontal and preferably approximately 15°. Discharge flow through the outlet orifice 24 is controlled by a sluice valve assembly 26, details of which will be more fully discussed hereinafter.

As noted in the drawings, the body portion 12 extends at its lower end below the sloped intermediate surface 22 and forms a skirt 28 which surrounds and recesses the sluice valve assembly 26 and also provides a pedestal or base for stabilizing the cup and permitting free standing upon a horizontal support surface.

The cup body 10 is preferably fabricated from a transparent material such as clear polycarbonate or Pyrex glass, and the sluice valve assembly 24 can be made of a high density polyethylene or equivalent material. Although the dimensions of the dispensing utensil 10 can be varied in accordance with the proposed use requirements, a 250 or 300 milliliter (approximately 8 or 10 ounce) capacity has been found to be adequate for most common usage within the kitchen.

A series of graduations 30 such as hatch markings are inscribed on the body portion 12 corresponding to the volumetric capacity of the utensil 10, and, for example, a 250 milliliter capacity can be graduated with spaced divisions indicating 25 milliliter increments.

The sluice valve assembly 26 includes a valve housing 32 having a discharge port 34 extending therethrough. The housing 32 is adapted for removable coupling to the cup body 12 with the discharge port 34 being in registration with the outlet orifice 24. A snap-fit watertight connection is provided between the valve housing 32 and cup body 12. In the embodiment shown this is accomplished by providing the outlet orifice 24 with a depending cylindrical extension 36 which carries a flexible sealing ring 38; a mating portion of the valve housing 32 has an internal diameter conforming to the external dimension of the extension 36 and is provided with a corresponding interior groove 40 for lockingly engaging the sealing ring 38 and providing a snap fitting.

The sluice valve assembly 26 also includes a slidable valve member or stem 42 having a gate closure element 44 at one end. The valve member 42 extends through an opening 46 in the skirt 28 and terminates in a finger grip element 48 at the other end. The gate closure element 44 is adapted for slidable accommodation within a receiving channel 50 formed in the valve housing 32. The gate closure element 44 is slidably displaceable in varying degrees into or out of the discharge port 34 for controlling the rate of outflow and for terminating flow.

In operation, the dispensing utensil 10 can be held in one hand by the handle 20; the other hand can be used to manually grasp the finger grip element 48 and to manipulate it through a push-pull action such as noted by the phantom lines in FIGS. 2 and 3. After the desired liquids have been discharged or conversely retained within the utensil 10, the gate closure element 44 is positioned to seal the discharge port 34, and the remaining contents can be poured utilizing handle 20 and lip 18.

It is also contemplated that a compression spring can be placed over the valve stem 42 and between the skirt 28 and gate closure element 44. This will contain the gate closure element 44 in a normally closed position.

It should be apparent that with a little dexterity and with the aid of graduations 30 the user can readily control and discharge a desired quantity of the liquid contents. Further, since the cup body 12 is transparent, visual observation of different colorations of the contents or of the division line between liquids of different specific gravities can be used for aiding in the separation of liquids as, for example, to remove fats or greases from gravies or soups.

After use, the valve housing 32 can be detached and removed for cleaning or sterilization. The valve stem 42 can be readily passed through the opening 46, and the gate closure element 44 can be slid out from within channel 50.

The strainer basket 16 provides for the filtering of the incoming liquids and can thus be used to remove undesirable particulate material or for preventing impurities from clogging or otherwise interfering with the operation of the sluice valve assembly 26. The strainer basket 16 includes a ring or retainer 52 which corresponds in diameter to the open mouth for complementary fit within cup body 12 and is designed for seating on edge 14. A selection of replaceable disc insets having different size openings or grid patterns such as disc 54 having apertures 56 forming a grid pattern can be respectively positioned and held in the retainer 52 as shown in FIG. 2. The strainer basket 16 can be removed after the inflow of liquids or prior to the pouring of the contents from the utensil 10 using lip 18.

It should be noted that the dispensing utensil of this invention can be applicable for other uses than those herein described and can dispense a wide range of fluids or flowable granulated materials in measured quantities as may be required in industrial, commercial or laboratory situations.

The above cited embodiment is intended as exemplary, and while it has described the invention with specific implementation thereof, other modifications and changes might be made in this embodiment as set forth and will be apparent to those skilled in the art. Furthermore, it should be understood that all material shown and described in the accompanying drawings is to be interpreted as illustrative and not in a limiting sense, and the invention should be considered as comprehensive of all of the same which come within the scope of the appended claims.

Having described the invention, there is claimed as new and desired to be protected by Letters Patent:

1. A dispensing utensil suitable for treating and discharging measured quantities of liquids comprising a substantially cylindrical cup body having an open mouth, the body including a transverse interior wall surface, said wall surface being sloped toward and defining an outlet orifice in said cup body for gravity discharge flow of the liquid contents, the cup body further extending below the outlet orifice to form a skirt wall, said skirt wall providing a pedestal for supporting the cup on a horizontal surface, flow control means operable for regulating discharge flow, said flow control means having an externally mounted sluice valve assembly, said sluice valve assembly being recessed within the skirt wall and including a valve housing and a valve member slidably accommodatable within said housing, coupling means for detachably connecting the valve housing to the cup body, the coupling means including a depending collar formed integrally with the cup and surrounding the outlet orifice, said depending collar being adapted for interfitting, manually separable, fluid tight engagement with the valve housing for removably securing the valve housing to the cup in registration with the outlet orifice, said valve housing further having a discharge port, said slidable valve member having an extension projecting through an opening formed in the skirt wall, said extension providing accessibility to the recessed valve assembly for permitting selective displacement of the valve member with respect to the discharge port to regulate discharge flow from the cup, said valve assembly being detachable as a unit from the cup body with the valve member being positioned to seal the discharge port, the valve member further being withdrawable through the opening in the skirt wall and removable from within the valve housing, whereby the component valve elements can be readily disassembled and separated for cleaning.

2. A dispensing utensil as claimed in claim 1 further including strainer means for filtering incoming liquids into the cup body, said strainer means being adapted for seating over the open mouth of the cup body, said strainer means further including an apertured disc inset for insertion into said strainer means.

3. A dispensing utensil as claimed in claim 1 wherein the valve member has a gate closure element at one end thereof and a finger grip element at the distal end, said gate closure element being slidably received within a channel formed in the valve housing with said finger grip element being positioned exteriorly of the skirt wall.

4. A dispensing utensil as claimed in claim 1 wherein the transverse wall surface is sloped at a constant gradient within the range of 10°-20° from the horizontal toward a centrally located outlet orifice, said surface being sloped to improve hydraulic flow characteristics of the discharge flow and for reducing sedimentation within the cup body.

5. A dispensing utensil as claimed in claim 2 wherein the strainer means is comprised of a retainer conforming to and adapted for selective placement over the open mouth of the cup body, a plurality of apertured disc insets respectively having different size filter openings therethrough whereby one of said disc insets can be inserted into said retainer in accordance with the size of the particulate matter to be removed from the incoming liquid.

6. A dispensing utensil as claimed in claim 1 wherein the depending collar formed integrally with the cup body is adapted for snap-fit with the valve assembly.

7. A dispensing utensil as claimed in claim 1 wherein the cup body is transparent for providing visual observation of the quantity of contents within the cup.

* * * * *